United States Patent [19]
Choi et al.

[11] Patent Number: 5,313,187
[45] Date of Patent: * May 17, 1994

[54] BATTERY-POWERED FLASHING SUPERLUMINESCENT LIGHT EMITTING DIODE SAFETY WARNING LIGHT

[75] Inventors: Robert S. Choi, Landisville; C. Kwai Kong, Mount Joy; Oong Choi, Lancaster, all of Pa.

[73] Assignee: Bell Sports, Inc., Calif.

[*] Notice: The portion of the term of this patent subsequent to Dec. 29, 2009 has been disclaimed.

[21] Appl. No.: 578,504

[22] Filed: Sep. 6, 1990

Related U.S. Application Data

[63] Continuation-in-part of Ser. No. 420,068, Oct. 11, 1989, abandoned.

[51] Int. Cl.$^5$ .............................. G08B 5/00; B60Q 7/00
[52] U.S. Cl. .................................... 340/331; 340/321; 340/815.03; 340/432; 340/471; 340/473; 340/908.1; 315/200 A; 362/800
[58] Field of Search ............... 340/331, 332, 321, 432, 340/782, 760, 762, 815.03, 908.1, 471-473; 315/200 A, 241 R, 174; 362/800, 157, 83.3

[56] References Cited

U.S. PATENT DOCUMENTS

| | | | |
|---|---|---|---|
| 4,271,408 | 6/1981 | Teshima et al. | 362/800 |
| 4,298,869 | 11/1981 | Okuno | 362/800 |
| 4,634,928 | 1/1987 | Figueroa et al. | 362/800 |
| 4,654,629 | 3/1987 | Bezos et al. | 340/331 |
| 4,885,508 | 12/1989 | Krokaugger | 315/293 |
| 5,175,528 | 12/1992 | Choi et al. | 340/331 |

Primary Examiner—Donnie L. Crosland
Attorney, Agent, or Firm—Burns, Doane, Swecker & Mathis

[57] ABSTRACT

One or more superluminescent light emitting diodes (SLDS) are driven with an oscillatory square wave pulse drive signal Vd varying between 0VDC and 1.8-3.2VDC at a frequency between 1Hz to 12Hz, preferably between 6Hz to 8Hz, and having a pulse duty cycle between 5% to 10%, preferably between 6% to 8%, to periodically forward bias the SLDs into illumination and produce a brilliant rapidly flashing light having high on-off contrast for enhanced visibility and perceptibility at a distance, thus being usable for battery-powered visual indicator and warning flasher applications. A low frequency oscillator stage generates an oscillatory square wave voltage signal Vo which drives a power driver stage to produce the correspondingly oscillating drive voltage signal Vd which is supplied to the SLDS. The frequency and duty cycle of the drive pulse signal Vd are chosen to produce enhanced SLD illumination brightness for high on-off contrast and to operate the SLD within its most efficient operating characteristics for long battery life. An exemplary circuit utilizes an asatable monovibrator employing two transistors operated in the saturation mode with positive feedback as the low frequency oscillator, and a third transistor is driven as a saturated switch by the oscillator output Vo and acts as a power driver stage to switch battery current supplied to the SLDs as the drive voltage Vd for flashing the SLDs on and off at the frequency and pulse duty cycle of Vo. The pulse on time and off time and thus the flash frequency and duty cycle are determined by RC time constants of feedback circuits in the oscillator stage and thus can be set by selecting appropriate component values.

16 Claims, 2 Drawing Sheets

BATTERY-POWERED FLASHING SUPERLUMINESCENT LIGHT EMITTING DIODE SAFETY WARNING LIGHT

CROSS-REFERENCE TO RELATED APPLICATIONS

This application is a continuation-in-part of prior copending U.S. patent application No. 07/420,060 filed Oct. 11, 1989 and entitled "Battery-Powered Flashing Superluminescent Light Emitting Diode Safety Warning Light", now abandoned the disclosure of which prior application is hereby incorporated herein by reference thereto.

BACKGROUND OF THE INVENTION

The present invention is related in general to flashing warning lights, and, more particularly, to the provision of a high luminous intensity flashing warning light using superluminescent light emitting diodes for improved visibility and lower power consumption than conventional devices.

Flashing (i. e. intermittently or periodically illuminated) lights have long been used to provide visual warnings, and a considerable body of research has been compiled in the fields of physiology, psychology and engineering (and more recently in that hybrid field known as "human factors engineering") concerning human perception of flashing light (i. e. the ability of people to perceive and respond to flashing light). This field of study, which is inter-disciplinary, involves both the illumination art and the study of so-called psycho-visual or psycho-optical sensory phenomena.

From research and study in this field, a large number of factors have been identified and suggested as involved in the human perception of and reaction to flashing light, and although much knowledge on the subject is theoretically based and remains to be confirmed, there have been suggested certain factors which may be applied to the provision of a flashing warning light for improving the visibility of a flashing light, that is, for making a flashing light visible at a greater distance (i. e. "visibility"), and for enhancing the probability that people will not only perceive (i. e. see) the flashing light but will also react consciously thereto (i. e. "attention-getting").

It is suggested for example from the study of human factors that human visual perception of flashing light appears greatest when the light is flashed at a flash rate or frequency in the range of 3 to 10 flashes per second, with a flash duration of at least 0.05 seconds being recommended. Further, for the flashing of a light to be perceived as discrete flashes, the flash rate or frequency must be below the so-called "flicker-fusion" frequency, that is the frequency above which a flashing light appears as a steady light (i. e. due to the phenomenon of "persistence of vision"), this critical frequency being considered to be approximately 24–30 flashes per second.

For simplicity, hereinafter flash rate or frequency will be described in terms of "flashes-per-second" (fps).

Research has revealed other factors to be pertinent concerning perception of light in general, and flashing light in particular. For example, according to Fechner's Law the sensation of light as produced by the eye varies logarithmically with the intensity of the stimulus.

Luminance discrimination has also been experimentally studied, with regard to what psychosensory mechanisms are involved in discerning or seeing light flashes and in discriminating luminance differences between light flashes, in an attempt to establish psychometric curves for these functions. For example, it has been attempted to demonstrate that there are two discrete detection channels, one for long flashes and one for short flashes. Experiments have shown that different slopes are obtained for psychometric curves measured with short and long flashes. The explanation favored is that the visual system is not homogenous; there are at least two detection channels with inherently different slopes, and it is believed that these can be differentially tapped by varying test flash parameters. Results of some experiments tend to confirm this, and suggest that whereas the long flash detection channel is photometrically subtractive or subadditive, the short flash detection channel is photometrically additive and has a much steeper psychometric function slope than the long flash detection channel. It is further suggested that the psychometric function slopes of the different visual sensory channels vary differently as a function of wavelength, and it has been adduced that all three channels of the visual system do not have the same gain but rather differ in spectral sensitivity.

An interesting question concerns the relationship between the light detection and the flicker threshold. When flashes are supplied within a certain interval, they are perceived as being fused and are indistinguishable from continuously supplied light. It has been almost 150 years since it was shown that, under fused circumstances, the mean intensity over time is independent of the actual light-dark ratio. A further question concerns how many extra quanta of light must be added to flashes perceived as fused at the absolute threshold of vision to perceive a flickering light again, or more precisely, in order to see a regular high-frequency flickering light again (since fused light at threshold level is perceived as irregular flickering light). It is has been previously shown that the visual perception system's processing of quantal effects at low luminance levels is essentially nonlinear. Flicker can be detected either by the "on response" or by the "off response" of the visual system to a flash of light. In the case of the on response, extra light quanta have to be supplied so that the threshold set by the adaptational state induced by the previous stimuli is exceeded. A larger interval between flashes leads to a lowering of the adaptational state (because of a decrease of the flux) and thus to lower thresholds. In the case of the off response, the excitation state has to decrease by a certain amount in order to exceed the decrement threshold. If flashes last long enough for a stable adaptation level to be reached, then the threshold no longer depends on the actual flash duration. Experimental results have shown that after 100 msec this stable level can be reached and maintained by a constant intensity in the flashes.

With regard to critical fusion frequency as a function of mean intensity at low luminance levels, it is has been suggested that the critical fusion frequency increases from 6 to 25 Hz with increasing stimulus size. It has also been found that, at higher luminance levels, brief flashes need a longer interval to elicit flicker perception than do long-lasting flashes.

In summary, it may be concluded that simple flashes of light elicit a whole range of complex responses from the visual system relating to retinal potentials, subcortical potentials, primary-visual-cortex and associated area potentials, and generalized non-specific responses of the cortex.

Various different types of flashing lights have been known to be used for providing visual alert or warning lights, and have employed incandescent lamps, rare gas discharge lamps and, more recently, light emitting diodes as an illumination means, with some associated control circuitry. However, each of these previous types of illumination means has its disadvantages. Further, the design and operation of such previous types of flashing lights did not take into account the various factors such as flash rates and durations for optimizing the psychosensory perception of flashing light. Still further, the previous flashing light devices could not provide effective light output with low power consumption (i. e. efficiency) at desirable high flash rates, or could not do so without severely sacrificing device power consumption and reliability of the light source, and thus could not provide reliable low power operation and were thus not suitable for use in portable lightweight battery powered equipment.

For example, while incandescent light sources have commonly been used in flashing warning lights, there is the problem that, typically, incandescent light sources are not able to come to full brightness and to then cool off to extinction (i. e. turn on and off) within the higher optimum flash rate frequencies for attracting attention; the flashing character of tungsten-filament lamps is typically degraded significantly above flash rates of 9 fps. Furthermore, because of the inherent thermal inertia of incandescent light sources (once turned sufficiently on to emit light, there is a significant delay in extinction to the off state), such light sources cannot provide flashes of relatively short duration, nor can such light sources provide adequate on-off contrast when operated at higher flash rates. As a consequence, incandescent light sources are not suitable for use as warning lights at those flash rates and flash duration periods to which human visual perception is most sensitive but are constrained to use at lower frequencies and longer flash periods.

Still further, incandescent lamps are inefficient due to their emission of considerable energy at wavelengths outside the visual spectrum, and suffer inherent increased power loss, thermal inertia and filament degradation when operated at higher intensity and/or flash rates. An incandescent flashing light with adequate intensity for outdoor use usually requires larger size batteries to compensate for the excessive power loss in the form of heat, thus rendering it impractical for applications requiring reasonably small size and light weight necessary for portability. Durability of incandescent flashing lights is also degraded due to the thermal stress on the filament and mechanical shocks received by the filament.

Rare gas discharge lamps (e. g. Xenon, Argon flash tube lamps and strobes), while capable of operation at higher flash rates are, however, limited to extremely short flash durations which cannot be lengthened. Thus, such light sources are incapable of longer flash duty cycle operation. Furthermore, rare gas discharge lamps are relatively expensive and must necessarily be energized with high voltages and currents, and thus flashing warning lights of this type require complex charging and discharging circuits and consume considerable power. Furthermore, a large amount of energy is required to produce the flashing action of a rare-gas lamp; it tends to deplete ordinary batteries quickly if flashed at an optimal frequency of 3 to 12 Hz continuously such as that required by a warning light. Therefore, rare-gas discharge lights for extended flashing time are only feasible where a large power source is available, such as the utility power, or a power generator, but not in a portable application. Furthermore, being glass-encased, gas discharge flash tubes are susceptible to mechanical shock damage and to gas leakage rendering them inoperative.

Ordinary light emitting diodes (LEDS) are relatively durable mechanically and electrically (as long as their current supply is properly limited) and most readily lend themselves to low voltage-low current operation and electronic control for both flash rate frequency and duration. However such ordinary LEDs as have previously been used as light sources in flashing warning lights were of insufficiently low light intensity output. Hence the use of such low luminosity light emitting sources in visual warning devices has been of limited effectiveness, being restricted to subdued light environments such as for indoor activities, or where the ambient or background light level is quite low so that sufficient contrast can be obtained with the relatively dim illumination intensity of ordinary LEDs to render them visible against a background. Thus, ordinary LED flashers have only found wide application in toys, jewelry and other devices where visibility requirements are not critical. Examples of such prior devices are found disclosed in U.S. Pat. Nos. 3,786,246 and 3,812,614 (flying disc type toys); U.S. Pat. No. 4,308,572 (clothing ornament); U.S. Pat. No. 4,170,036 (jewelry); and U.S. Pat. No. 4,383,244 (skate wheel).

In order to be both effective and practical, a portable warning light should satisfy at least the following five requirements:

1. Adequate visibility, and attention-getting quotient, which involve considerations of various factors such as the luminous intensity as well as the on-off contrast ratio of the light source, flash rate/frequency, and flash duration/period;

2. Controllability, which involves the relative ease of controlling the light source for effective flash rate frequency and flash duration;

3. Extended operating battery life, which is a critical factor and requires balancing the interdependent factors of the power available, the light output intensity, and the permissible weight of the device;

3. Durability, which concerns the reliability of the device;

4. Light weight and small size, which requirements constrain the use of large and/or heavy batteries and thus affects the available power, limiting permissible power consumption in order to achieve adequate operating life; and 5. Cost, which is often of paramount concern since complex devices not only adversely affect economy in manufacture, but also the applicability of such devices to use by consumers.

Unfortunately, although numerous prior flashing light devices are known, these prior devices have failed to meet or satisfy all of the above-noted requirements for use in a portable flashing warning light.

Various prior safety flasher light devices have been proposed. Exemplary of such prior devices are those safety lights disclosed in U.S. Pat. Nos. 4,423,473 and 4,451,871. In these devices, a penlight battery power supply is coupled to an ordinary LED mounted within a lensed reflector housing by means of a position sensitive mercury switch, so that, when the device is worn or carried, the position sensitive switch will on account of sensing the wearer's movements connect power to the LED to cause intermittent bursts of light to be emitted thereby. It is described that because power is supplied only intermittently to the LED, the light source LED may be operated from a battery source which provides current to the light source LED in excess of its maximum current rating to provide light of greater intensity than is normally producible from such light source (i. e. an ordinary low luminosity LED). Such a device however does not produce flashes at any particular effective flash rate (apart from being responsive to the rhythm of the wearer's motions sensed thereby), nor of any particular flash duration and thus is not optimal for attracting attention, nor reliable since it regularly will subject the LED to an overcurrent condition which while perhaps brief risks damaging the LED junction nevertheless should the mercury switch connection remain on for too long. Another motion-switched intermittently flashed safety light device is disclosed from U.S. Pat. No. 4,535,392.

In U.S. Pat. No. 4,523,258 there is disclosed a safety belt with flashing LEDs for joggers in which an array of LEDs arranged along a reflective belt are connected to a battery-powered oscillator circuit including two separate oscillators, one oscillating at <1 to 5 Hz, and another oscillating at 3 Hz. Sets or subsets of the LEDs in the array are alternately driven by connecting these oscillators to opposite nodes of the array, such that one oscillator forwardly biases the LEDs and the other oscillator reversely biases the LEDS, such that LEDs of different sets are driven only when forwardly biased and thus flash alternately. However, such a device is only suitable for low ambient light conditions.

In U.S. Pat. No. 4,819,135 there is shown a bicycle lighting device in which strings of LEDS are mounted along the frame tubes of a bicycle and flashed in sequence to provide a broadside flashing triangular slow moving vehicle signal to motorists. U.S. Pat. No. 4,763,230 shows a string of LEDs adapted to be secured to the spokes of a bicycle wheel.

Other portable safety flasher lights are known from U.S. Pat. Nos. 3,153,745; 3,840,853; and 4,323,879. Flashing or blinking signal light devices for bicycles and other vehicles are also known from U.S. Pat. Nos. 2,661,406; 3,764,976; 3,916,377; 3,974,369; 3,987,409; 4,019,171; 4,388,559; 4,550,305; 4,598,339; and 4,692,736.

The use of light emitting diodes instead of incandescent lamps in flasher lights offers advantages in longevity and lower power requirements. Devices using flashing LEDs are also known from U.S. Pat. Nos. 3,737,722; 4,228,484,; and 4,228,485. U.S. Pat. No. 4,271,408 discloses an array of LEDs mounted on a reflectorized substrate to form a colored light source, for use in signs. U.S. Pat. No. 4,654,629 discloses a vehicle marker light for end-of-train equipment use having arrays of LEDs which are driven to be flashed at prescribed or different flash repetition rates at night or during other low visibility conditions.

However, none of the known devices satisfactorily meet the myriad requirements for an effective portable safety warning flasher of high attention-getting visibility at low power consumption and light weight with low cost and high reliability, and thus there has remained a need for a device which can satisfy these requirements.

In copending prior U.S. patent application No. 07/420,068 there was disclosed a battery-powered flashing superluminescent light emitting diode warning flasher light directed to resolving the above stated requirements by taking advantage of the unique characteristics of recently commercially available so-called "Superluminescent" or "Superbright" lightemitting diodes (otherwise known simply as "superluminescent diodes" and abbreviated hereinafter for convenience as "SLDs"). SLDs are known for example from U.S. Pat. No. 4,634,928 and have semiconductor device constructions which provide relatively broad spectral width light output when operating at relatively high powers. Commercially available SLDs emit light at powers as high as 4–6 milliwatts or more in steady state, and are relatively inexpensive, not being very much more costly than ordinary low-luminosity LEDS. For example, the "Radio Shack" catalog lists as available a 5,000 mcd SLD (No. 276-086), and a 21000 mcd SLD rated at 20 milliamp at 1.85VDC (No. 276-087) as well as a blinking high intensity GaAlAs device with 1,200 mcd output and an 8° viewing angle and rated at approximately 40 milliamps at 1.7VDC (No. 276-020).

For purposes of the present description, a superluminescent light emitting diode (SLD) may be defined as one which has a light output (luminosity) of 1,000 millicandels or more per 20 milliAmperes supply current input when driven by a power signal current at 3 to 12 Hz with a variable duty ratio of 10 to 40%.

Furthermore, an SLD consumes only 20 milliamperes to generate its rated nominal light output (above 1,000 milliCandels). Since light emitted from an SLD is generated by the quantum release of light energy by excited electrons at the P-N junction of the diode (rather than by thermal radiation), its efficiency while less than that of other electroluminescent devices is still phenomenal especially when compared with conventional light sources since the light output spectrum of an SLD can be selected to fall completely within the visible range and the spectral bandwidth of the light output can be varied to increase with increasing optical output power. Higher operating power can be achieved in a pulse mode, and pulsed radiation output power of 50 mW has been obtained from SLDS. As a specific example, for one GaAlAs/GaAs red SLD device commercially available from Sharp Corporation of Japan under the model designation no. GL5R43, the manufacturer specifies an absolute maximum peak forward current rating of 300mA when the SLD is driven in a pulse mode with a pulse width of 1msec or less and a pulse duty cycle of 1/16 (approximately 6%), however under these rated conditions the actual pulse/flash frequency is approximately 60Hz which is well beyond the resolving response frequency limits of the human eye, so that such pulsing of the SLD is not discernible as discrete flashes.

The battery-powered flashing SLD safety warning light disclosed in copending prior U.S. application No. 07/420,068 uses a unique double oscillation circuit to effect the flashing of one or more SLDS. This type of drive arrangement takes advantage of the short rise and fall time of an SLD, typically in a fraction of a microsecond. The copending prior application also discloses a novel method of pulsing an SLD between the full on and full off states in the attention getting frequencies of 3 to 12 Hz. In accordance with the disclosed method of the copending application, the duty cycle of an SLD can be easily varied, preferably between 10 to 40%, to maintain a high on-off contrast ratio which further enhances the perceptibility of the light. In general, the double oscillator circuit allows a low frequency pulse drive signal (3 Hz to 12 Hz) to "gate" a high frequency (1 kHz to 5 kHz) drive pulse train (FIG. 2). By doing so, the emitted light appears to the human eye as 3 to 12 Hz flashes, while the SLD is actually being pulsed at the most efficient high frequency range (above 1 kHz) during the on-time of the low frequency period. Since the human eye cannot resolve pulsing light above 30 Hz, the high frequency pulsing above 1 kHz occurring during the "on time" period of the low frequency duration will appear only as a continuous illumination within each low frequency pulse period.

Battery-powered flashing superluminescent light emitting diode warning flasher lights have wide usefulness in applications in the field and on unpowered, horse-drawn and human-powered vehicles and where no other power source is available, for example as bicycle-mounted safety lights, bicyclist and jogger safety lights, road hazard flasher lights, breakdown warning lights, and as slow-moving vehicle warning lights. Other applications include electrically lighted ornaments, apparel ornaments, "electronic safety flares", helmet-mounted safety lights, emergency flasher lights, roadside construction site warning flasher lights, shoe lights, roller skate lights, hunter visibility safety lights, traffic control and warning lights, driveway lights, runway and helipad marker and landing "strobe" lights and traffic wands. The use of a small battery power source which is rechargeable by a solar energy converter (i. e. solar cell) make such applications even more advantageous by making battery replacement unnecessary or at least a less frequent necessity, an important consideration in remote locations.

The present invention can be used with multiple SLDS of a single emission color or with multiple SLDs of different emission colors. When groups of SLDs of different emission colors are used, these groups of differently colored SLDs can be turned on and off simultaneously to produce a color different from that of any of the SLDs' singly. Furthermore, groups of multiple color SLDs can be operated in such a way that each color group of SLDs are turned on and off simultaneously and sequentially in a manner that produces leading and trailing effects in combination with the chosen colors. In this way, even greater spectral width of the light output can be obtained, compensating for the spectral shift in the eye's response to light as may occur at twilight and dawn, and providing an enhanced visually perceptible effect for attracting the attention of observers.

Furthermore, because of the combination of high luminosity afforded by the utilization of SLDS, the novel drive technique implemented herein therefor and the tailoring of the flash rate and duration made possible by the present invention, the flashing light output signal from the present invention may be easily optimized for attracting attention in a manner offering a significant optical or visual effect enhancement over conventional warning lights, in accordance with psychosensory precepts, while providing a compact, simple low cost flashing safety warning light device having substantially improved reliability and long operating life with inexpensive low voltage battery power.

The present invention is amenable to various implementations for flashing safety warning lights, both portable and otherwise. As noted above, one possible implementation is as an "electronic flare", e. g. for disabled vehicles, while another possible implementation is as a substitute for the incandescent "blinker" lights as are commonly mounted on saw-horse stands for marking hazards and construction areas along roadways, with the benefit of extended operating life and reliability. The applicability of the present invention is not limited to warning indicators, however, as the brilliant flashing light produced by the present invention will also be useful anywhere a portable flashing light for getting attention might be desired, such as on advertising displays, wearing apparel, toys, campaign buttons, etc. And as noted above, portable safety flashers are also usable by pedestrians and joggers for alerting motorists to their presence on and alongside roadways. In general therefore, the applicability of a low cost battery-powered portable flashing SLD light is very wide, and the exemplary uses noted should be understood to be merely illustrative and not limitative, since the present invention is of wide applicability.

As noted above, the SLD drive circuit arrangement disclosed in copending prior application No. 07/420,068, in order to efficiently and effectively flash a SLD, utilizes dual oscillators for driving the flasher SLD, a high frequency oscillator (HFO) and a low frequency oscillator (LFO) which can be used to "gate,, the output of the HFO, and a power or output driver stage for supplying drive current to the SLD(s). While such a drive arrangement is both effective and efficient, the circuitry, requiring two oscillators and a power stage, remains relatively complex to implement. This complexity arises in part from the fact that while suitable integrated circuits are available for implementing the circuit functions, the cost and power consumption of suitable ICs for use in consumer devices limits their usefulness in such a circuit arrangement where battery life and manufacturing cost are important considerations, and thus makes the use of discrete component circuitry more practical.

Furthermore, the use of a dual oscillator-power driver circuit arrangement as in copending application No. 07/420,068 is, while most effective for flashing a SLD, relatively costly to manufacture and necessarily will consume more battery power in comparison to the use of a single oscillator circuit in the oscillator stage.

Thus, it remains desirable to provide a battery-powered flashing SLD safety warning light which is simple and economical to manufacture and which is able to deliver effective illumination levels with high on-off contrast for high visibility and attention-getting performance while still providing long battery life.

SUMMARY OF THE INVENTION

As described in copending prior application No. 07/420,068, the characteristics of SLD devices make it possible to attain full "on" luminosity and full "off" darkness at drive pulse duty cycles of 10–40% so that flashed SLD devices can provide excellent contrast ratio between their lighted "on" and dark off"states when driven at flash rates or frequencies of 3–12fps (i. e. 3–12Hz) with drive pulse voltage durations from 83–333msec, while delivering "on" state luminosity levels in excess of 1,000 mcd.

It has been found by the present inventors that by appropriately driving a SLD it is possible to obtain improved on-off contrast ratio with approximately the same (and possibly even reduced) power consumption in comparison to the device and method disclosed in copending prior application No. 07/420,068, and furthermore, that this improvement can be obtained by utilizing only a single oscillator drive circuit arrangement instead of the dual oscillator arrangement of the copending application.

In the dual oscillator drive circuit arrangement of the copending application, the HFO generates a continuous train of very short duration square wave pulses at 1-5KHz. As described in the copending application, as a rule of thumb it is recommended that SLD devices should be pulsed at frequencies of 1KHz or higher to minimize the ratio of maximum junction temperature to average junction temperature and thus to maximize device efficiency. This is because the maximum P-N junction temperature (rather than the average junction temperature) governs the performance of an SLD as to its average power dissipation and light output, while operating in the pulse mode. The lower the maximum junction temperature as a ratio to the average junction temperature, the greater the relative light luminosity, which results in lower power consumption for a given amount of light intensity. On the other hand, it is also considered good practice to keep the actual pulsing frequency of SLDs below 5 kHz to minimize "switching loss" in the power driver circuitry used to turn the SLD(S) on and off. In the copending application, these conflicting requirements are resolved by implementing a dual oscillator, dual frequency driving arrangement.

However, in the drive circuit arrangement of copending application No. 07/420,068, the HFO output at 1-5KHz, while serving to drive the SLD's P-N junction for most efficient operation, is so high in frequency as to be visually imperceptible, that is, the discrete flashes of the driven SLD at the HFO frequency cannot be resolved by the human eye, but rather the low frequency LFO gating of the HFO pulse output on and off is used to produce perceptible "flashing" of the SLD while at the same time serving to effectively avoid switching loss in the power driver circuitry.

Given the P-N junction characteristics of available SLD devices and the recommended operating practices noted, the present inventors have found that it is possible to efficiently operate such devices by driving them directly with drive voltage pulses at relatively low and visually perceptible frequencies of approximately 1-12Hz, preferably in the range of 6-8Hz, with pulses having a relatively short duty cycle (i. e. ratio of pulse "on" time duration to square wave period) in the range of approximately 5-10%, preferably 7-8%. It has been found that operating SLDs in such a manner provides a significant improvement in on-off contrast ratio, which is very advantageous in view of the importance played by contrast in perceptibility and gaining attention as described above. The relatively short duty cycle still allows the SLD junction to be operated efficiently, while the relatively low frequency of the drive voltage pulse signal applied to forward bias the SLD junction into luminosity minimizes switching loss in the drive circuitry.

In comparison to the SLD drive regime described in copending application No. 07/420,068, the drive regime of the present invention utilizes a decreased drive pulse duty cycle, that is, the "on" time or width of the SLD drive pulse in the present invention is shorter than the gating pulse width of the LFO output in the copending application. However, even though in the present invention the low frequency drive pulse "on" time is shorter than the LFO gating pulse width in the copending application, the drive pulse "on" time in the present invention is longer than that of the cumulative HFO drive pulses which drive the SLD during the gating pulse in the copending application, and thus the present invention supplies more drive current to the SLD during the "on" time of each drive pulse than is supplied to the SLD during the LFO gating pulse period in the copending application, so that the present invention can provide greater luminosity during the "on" time of each pulse and, as a consequence, improved contrast ratio.

As an adjunct, by shortening the SLD drive pulse "on" time while increasing the current supplied to the SLD during the drive pulse "on" time in comparison to the drive regime of the copending application, the present invention makes it possible to advantageously operate SLD devices in such a way as to obtain increased luminosity for enhanced contrast ratio while maintaining power consumption at approximately the same value as in the drive arrangement of the copending application.

Furthermore, by operating SLD devices with low duty cycle drive pulses in accordance with the present invention, it advantageously becomes no longer necessary to utilize the dual oscillator drive arrangement of the copending application, and instead it is advantageously only necessary to utilize a simpler single oscillator circuit capable of producing drive pulses having the necessary frequency and duty cycle, thus offering economies of manufacture and making it possible to provide consumers with a less expensive safety warning flasher light.

The battery-powered flashing SLD safety warning light of the present invention includes a low frequency oscillator stage providing a square wave pulse output signal Vo of suitable frequency (1-12Hz) and duty cycle (5-10%) to a power driver stage which in turn drives one or more SLD devices with a corresponding square wave drive voltage signal Vd.

The low frequency oscillator and power driver stages may be implemented using discrete circuitry, ICs or hybrid circuitry, and by linear or digital configurations. A simple implementation utilizing discrete circuitry with a minimum number of components is preferable for reasons of cost, ease of manufacture and power consumption. Preferably, the circuit implementing the low frequency oscillator stage may permit adjusting or setting both the output frequency and duty cycle.

One discrete circuitry implementation of the low frequency oscillator stage may be as an astable multivibrator using a pair of saturating bipolar junction transistors of the same type with the base of each transistor being positive feedback-biased by being coupled with the collector of the other via a capacitor so that astable operation occurs upon application of power to the circuit, producing a square wave output at the collector of each transistor. Such a circuit can be easily constructed with a minimum number of components, and frequency and duty cycle can be easily selected by specifying the values of the RC time constants for controlling the on and off switching time of each transistor. For implementing the power driver stage, a single bipolar junction transistor saturated switch circuit can be employed and the square wave pulse output signal from the collector of one of the transistors can be applied to the base of the power driver transistor which is switched into saturation by the pulse output of the oscillator stage and which in turn drives one or more SLD devices connected as a load at its output into forward biased operation with the battery voltage, typically 3 volts, at the frequency and duty cycle of the oscillator stage's square wave output to cause the SLD devices to be flashed on and off at the oscillator stage output signal frequency and duty cycle. A power switch placed in the power connection between the battery and the oscillator stage can be used to turn the device on and off.

It is therefore an object of the present invention to provide a battery-powered flashing SLD safety warning light which provides improved on-off contrast for enhanced visibility and perceptibility.

It is also an object of the present invention to provide a battery-powered flashing SLD safety warning light which is of simple and economical construction.

It is further an object of the present invention to provide a battery-powered flashing SLD safety warning light which provides increased luminosity without degradation in power consumption and battery life.

It is still further an object of the present invention to provide a battery-powered flashing SLD safety warning light which is able to provide efficient flashing operation of SLD devices.

It is furthermore an object of the present invention to provide a method for operating SLD devices in a visually perceptible flashing mode.

BRIEF DESCRIPTION OF THE DRAWINGS

These and other objects, features, details and advantages of the present invention will be made more apparent from the following detailed description of the invention taken in conjunction with the drawings, in which like designations among the figures reference like elements and in which.

DETAILED DESCRIPTION OF THE INVENTION

Figure 1:
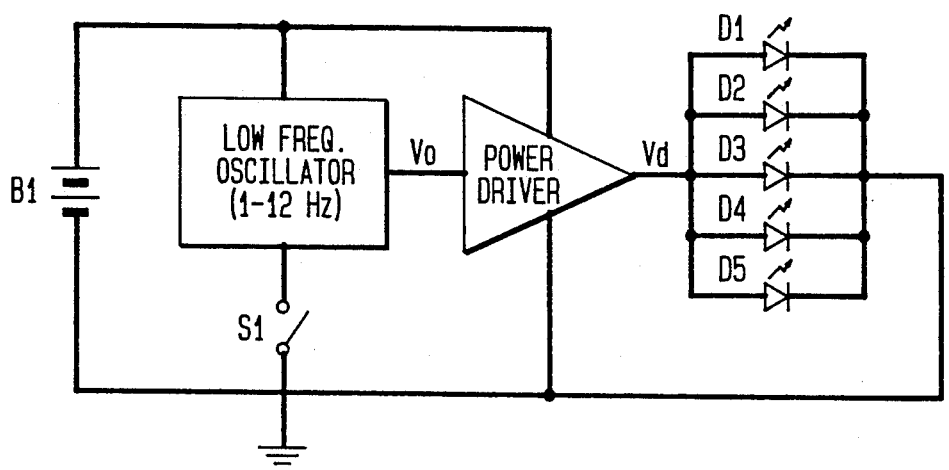
FIG. 1 is a block circuit diagram of the battery-powered flashing superluminescent light emitting diode safety warning light of the present invention.

As shown in FIG. 1, the battery-operated flashing superluminescent light emitting diode (SLD) safety warning light of the present invention may be implemented as a circuit which includes as its power source a battery B1, typically a dry cell type of 3 nominal volts. Battery B1 may for example consist of a pair of AA size penlight type cells connected in series to provide a working voltage of 1.8V (minimum) to 3.2V nominal. Other battery types, such as rechargeable NiCd cells of suitable voltage are also usable for battery B1.

The negative (ground) terminal of battery B1 is connected to the cathode of one or more SLDs to be driven as a load. In FIG. 1, five SLDs D1 through D5 are shown connected in parallel with their respective anodes and cathodes made common, however, different numbers of SLDs are of course usable so long as drive voltage and current requirements are met. Superluminescent light emitting diodes (SLDS) D1-D5 may be of any commercially available type having a typical nominal rated luminosity of 1,000 to 5,000 mCd or more a nominal rating of 20 mA forward current, such as those noted above. One suitable SLD device for a red warning flasher application is the Model No. GL5LR43 GaAlAs/GaAs red emitting SLD manufactured by Sharp Corporation Electronics Compound Semiconductor Division, Japan. Other SLD devices having different emission spectra (including those emitting in the visible, IR and/or near IR bands) could be employed depending upon the intended application.

The positive and negative power supply input terminals of a low frequency oscillator stage LFO are connected in parallel with the positive and negative terminals of battery B1 for receiving battery voltage (e. g., 3VDC) supply therefrom. SPST switch S1 is placed in the negative supply line and serves to switch oscillator stage LFO on and off, and thereby, in effect, provides on-off switching control of the entire device proper.

Figure 2A:
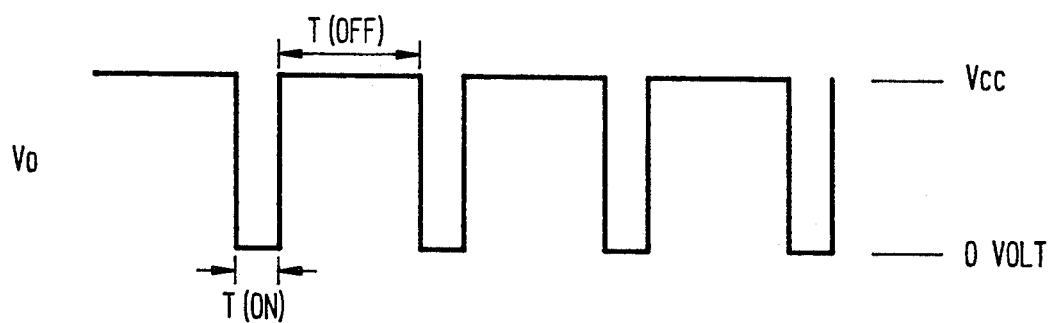
FIG. 2(a) is a waveform diagram of the oscillator output signal Vo.

Low frequency oscillator stage LFO provides a fixed frequency oscillatory square wave output signal Vo in the frequency range of 1–12Hz, preferably in the range of 6–8Hz. That is, the oscillation frequency of oscillator stage LFO is constant, however, the exact oscillation frequency is determined by component values in the oscillator stage circuitry and can thus be set to a particular frequency by selection of component values as will be described below. Further, the duty cycle (i. e. "on" time) of the square wave output Vo of oscillator stage LFO is also fixed in the range of 5–10%, preferably in the range of 7–8%, and is determined by component value selection as will be also described below. Thus, both the frequency and duty cycle of the oscillatory square wave signal Vo output by the oscillator stage LFO can be tailored by selection of appropriate component values in implementing oscillator stage LFO. FIG. 2(a) graphically depicts the waveform of the oscillator output voltage signal Vo.

A power driver stage PD also has its positive and negative power supply terminals connected in parallel with the positive and negative terminals of battery B1 for receiving battery voltage supply therefrom. Power driver PD has a signal input connected to the Vo signal output of low frequency oscillator stage LFO, and also has a signal output connected to the common anodes of parallel SLD devices D1–D5. The signal input of power driver stage PD receives the oscillatory square wave signal Vo from the output of low frequency oscillator stage LFO, and, in accordance therewith, outputs a corresponding oscillatory square wave drive voltage signal Vd which drives SLDs D1–D5 as a series load as shown. In effect, power driver stage PD periodically switches battery voltage supplied to SLDs D1–D5 on and off, that is, between 0V and the nominal battery voltage level.

Figure 2B:
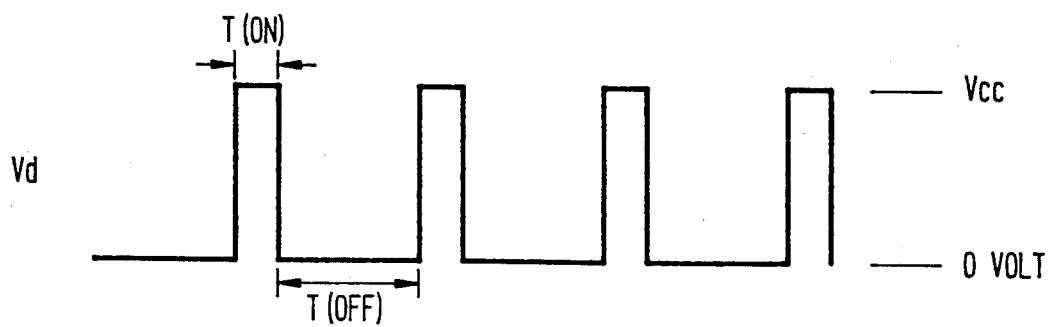
FIG. 2(b) is a waveform diagram of the SLD drive signal Vd.

FIG. 2(b) graphically depicts the waveform of drive voltage signal Vd which, as shown, is a periodic square wave pulse signal which regularly varies between 0V (i. e. ground) and the battery voltage (i. e. 3V nominal), and thereby periodically supplies load current to SLDs D1–D5 which, upon being powered, emit light, whereby a brilliant flashing light is produced. Drive signal Vd has a frequency in the range of 1–12Hz, preferably in the range of 6–8Hz, and a duty cycle in the range of 5–10%, preferably in the range of 7–8%, and thus corresponds with the output signal Vo of low frequency oscillator stage LFO. It should be noted that the waveforms of signals Vo and Vd shown in FIGS. 2(a) and 2(b) are the inverse of one another while corresponding otherwise in frequency and pulse width/duty cycle due to the way in which these signals are obtained in an exemplary circuit of the present invention as explained below.

Figure 3:
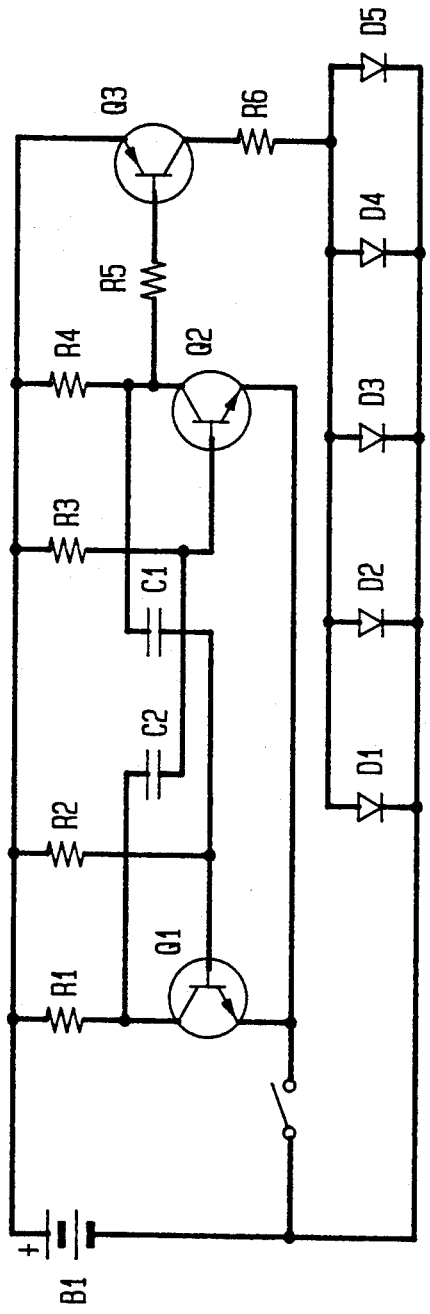
FIG. 3 is a schematic diagram of exemplary circuitry of a battery-powered flashing superluminescent light emitting diode safety warning light in accordance with the present invention.

Referring now to FIG. 3, there is shown in detail an exemplary discrete circuit for implementing the battery-powered flashing superluminescent light emitting diode safety warning light of the present invention. Power is supplied to the linear circuit by battery B1, typically a pair of 1.5V AA penlight cells connected in series delivering a nominal rated usable voltage of from 3.2V (maximum) to 1.8V (minimum) as described above.

The low frequency oscillator stage LFO is implemented by the astable multivibrator circuit composed of transistors Q1 and Q2, capacitors C1 and C2, and resistors R1, R2, R3 and R4, and power to this stage is switched on and off via SPST switch S1. Transistors Q1 and Q2 may conveniently be a pair of 2N4400 NPN small signal general purpose amplifier types which are operated in a saturation mode with positive feedback biasing. The oscillatory pulse train output signal Vo is taken from the collector of transistor Q2.

The power driver stage PD of FIG. 1 also draws power from battery B1 and is composed of PNP transistor Q3, base current resistor R5 (150Ω) connecting the collector of transistor Q2 with the base of Q3 and current limiting resistor R6 (2.2Ω) connecting the collector of Q3 with the anodes of SLDs D1-D5. Transistor Q3 may conveniently be a type 2N4402 small signal general purpose amplifier operated in a saturated switching mode. Transistor Q3 is switched on and off in accordance with the oscillator stage output signal Vo applied to its base, and in turn switches battery current flowing through SLDs D1-D5 connected as a load at its collector on and off to produce drive voltage signal Vd for flashing the SLDs D1-D5 on and off.

The operation of the exemplary circuit illustrated in FIG. 3 will now be explained. Initially, with switch S1 open, no oscillation of the oscillator stage occurs, and the device is thus, in effect, switched off. That is, with switch S1 open, both capacitors C1 and C2 are in effect discharged, the collector of Q1 is held at the positive battery supply potential Vcc by resistor R1 (33KΩ), and the base of Q1 is held at the positive supply potential Vcc by resistor R2 (82KΩ). The collector and base of Q2 are similarly held at the positive supply potential Vcc by resistors R4 (33KΩ) and R3 (620KΩ), respectively. The emitters of transistors Q1 and Q2 are floating, due to switch S1 being open. In this state, neither of transistors Q1 nor Q2 conduct collector current, effectively being both "switched off" or in a cutoff state. Furthermore, both the base (via R4) and emitter of power driver stage transistor Q3 are also held at the positive supply potential Vcc, and thus Q3 is in a cutoff state.

When switch S1 is closed, the negative terminal of battery B1 is connected to the emitters of both transistors Q1 and Q2, which are thus both biased on. Capacitor C2 (0.47μF) has a larger capacitance than capacitor C1 (0.22μF), while resistor R2 (82KΩ) has a lower resistance than resistor R3 (620KΩ). Thus, when switch S1 is first closed, and both transistors Q1 and Q2 begin to turn on, both capacitors C1 and C2 begin charging and, because capacitor C2 connected to the base of Q2 is larger, capacitor C2 generates a higher charging current via R1 than does capacitor C1 (via R4) connected to the base of transistor Q1 so that transistor Q2 has a larger base current, via R1 and C2, than does transistor Q1, via C1 and R4, and therefore transistor Q2 goes into saturation more quickly than does transistor Q1. Thus, during the initial oscillator circuit turn on phase (when switch S1 is first closed) transistor Q1's base current is governed by resistor R4 and capacitor C1, and transistor Q2's base current is governed by resistor R1 and capacitor C2. The charging current generated as C2 is charging (via R1) flows into the base-emitter junction of transistor Q2, causing transistor Q2 to turn on.

As transistor Q2 goes into saturation, it causes the base current of transistor Q1 to discharge rapidly through capacitor C1 and the collector-emitter circuit of transistor Q2. At this time, the base voltage of transistor Q1 is capacitively coupled to the collector voltage of transistor Q2, at approximately −0.5V. The rapid discharging of capacitor C1 forces transistor Q1 into a cutoff state. After the almost instantaneous discharge period of capacitor C1, capacitor C1 immediately begins to charge via resistor R2. When the voltage charge on capacitor C1 reaches the conduction (turn-on) threshold of the base-emitter junction of transistor Q1 (approximately 0.5V at approximately 7msec), transistor Q1 begins to conduct and its collector voltage drops rapidly.

When transistor Q1 begins to conduct, the falling collector voltage of transistor Q1 rapidly discharges capacitor C2 and at the same time, due to the falling base current at the base of transistor Q2, thereby forces transistor Q2 into a cutoff state so that the collector voltage Vo of transistor Q2 again rises rapidly to the positive supply potential Vcc. After the almost instantaneous discharging of capacitor C2 is complete, capacitor C2 then immediately begins to again charge via resistor R3. When the voltage charge on capacitor C2 reaches the conduction (turnon) threshold of the base-emitter junction of transistor Q2 (approximately 0.5V at approximately 110msec), then transistor Q2 again starts to conduct into saturation and its collector voltage again falls, starting the next cycle of the oscillation process.

This alternate action of turning transistor Q2 off and on thus generates an oscillatory rapidly rising and falling square wave pulse train voltage signal output Vo at the collector of transistor Q2.

Whenever the collector voltage Vo of transistor Q2 is "low", a base current is drawn through resistor R5 out of the base-emitter junction of transistor Q3 of the power driver stage. Because the battery voltage varies between 1.8V (minimum) and 3.2V (maximum) nominally, a base current of approximately 5-15mA will be available, assuming the voltage drop across the base-emitter junction to be 0.5-0.7V, thus switching transistor Q3 on in the saturated mode. The turning on and off of power driver stage transistor Q3 is thus controlled by the oscillatory square wave signal Vo at the collector of oscillator stage transistor Q2 which supplies base current for transistor Q3 and thereby causes transistor Q3 to output the drive voltage signal Vd corresponding in frequency and duty cycle to the oscillator output voltage Vo. Operating transistor Q3 as a saturated switch in this way allows maximum voltage potential to be made available to SLDs D1-D5 which typically have a voltage drop of 1.7V. When transistor Q3 is switched on and drive voltage Vd is "high", current will flow through protective current limiter resistor R6 and then through SLDs D1-D5 thus energizing SLDs D1-D5 to illuminate. When oscillatory voltage Vo at the collector of transistor Q2 goes high, the base current for transistor Q3 will be cut off, causing transistor Q3 to cut off and in turn causing drive voltage Vd to go low, stopping current from flowing through resistor R6 and extinguishing SLDs D1-D5.

In this way, the pulsating oscillatory voltage Vo developed at the collector of low frequency oscillator stage transistor Q2 causes power driver stage transistor Q3 to switch on and off in accordance therewith to generate drive voltage Vd, thereby correspondingly switching on and off the current supplied through SLDs D1–D5 and generating a brilliant flashing light at the frequency and duty cycle of the oscillator output Vo, having high on-off contrast suitable for use as a visual warning.

It will be appreciated that the frequency and duty cycle/pulse width (on time and off time) of oscillatory voltage signal Vo and accordingly of the flashing of SLDs D1–D5 are determined by the charging and discharging time constants of capacitors C1 and C2. Referring again to FIG. 2, the calculation of the "on" time "T(on)" (i.e. SLD illumination time) and "off" time "T(off)" (i.e. SLD extinction time) of oscillatory voltage signal Vo will now be explained.

Since the discharge time of capacitor C1 may, for practical purposes, be considered to be negligible, the SLD "on" time is basically that time required to charge capacitor C1 from $-0.5V$ to $0.5V$, the voltage at which the base-emitter junction of transistor Q1 becomes forward biased into saturation. Letting "Tc1" represent the charge time of capacitor C1, and since the time constant for charging capacitor C1 is determined by the RC circuit of C1 and R2, then:

$$Tc1 = -R2 \times C1 \ln(1 - V'/Vcc) \quad (1)$$

where V' is the total rise-time from $-0.5V$ to $0.5V$ and Vcc is 3.0V, the nominal voltage for two AA batteries in series. Therefore, by using the exemplary circuit values above in equation (1) we can find Tc1:

$$Tc1 = -82K\Omega \times 0.22\mu F \ln(1 - 1V/3V) \quad (2)$$

which yields the result:

$$Tc1 = 7.2 msec \quad (3)$$

And since $$T(on) = Tc1 \quad (4)$$

then $$T(on) = 7.2 msec \quad (5)$$

The "off" time "T(off)" can be calculated in a similar manner. Since the discharge time of capacitor C2 may, for practical purposes, considered to be negligible, the SLD "off" time is basically that time required to charge capacitor C2 from $-0.5V$ to $0.5V$, the voltage at which the base-emitter junction of transistor Q2 becomes forward biased into saturation. Letting "Tc2" represent the charging time of capacitor C2, and since the time constant for charging capacitor C2 is determined by the RC circuit of C2 and R3, then:

$$Tc2 = -R3 \times C2 \ln(1 - V'/Vcc) \quad (6)$$

where V' is the total rise-time from $-0.5V$ to $0.5V$ and Vcc is 3.0V, the nominal voltage for two AA batteries in series. Therefore, by using the exemplary circuit values above in equation (6) we can find Tc2:

$$Tc2 = -620K\Omega \times 0.47\mu F \ln(1 - 1V/3V) \quad (7)$$

which yields the result:

$$Tc2 = 117 msec \quad (8)$$

And similarly, since $$T(off) = Tc2 \quad (9)$$

then $$T(off) = 117 msec \quad (10)$$

Therefore, using the above described component values for capacitors C1, C2 and resistors R2, R3, and with "on" time T(on) thus being 7.2msec and the "off" time T(off) thus being 117msec, the SLDs will be flashed at a frequency of approximately 8Hz (7.58Hz) and at a pulse duty cycle of approximately 6%. This particular flash rate and duty cycle for operating SLD devices has been found to be particularly advantageous in that it provides brilliant flashes for high visibility with enhanced on-off contrast ratio for greater perceptibility of the flashes, while also maintaining efficient operation of the SLD's P-N junction and offering excellent battery power consumption characteristics, and is therefore preferred for general visual warning flasher and indicator use.

Furthermore, using known techniques for selecting circuit components and operating parameters, flash rate and duration may be easily varied and optimized as desired, e.g. to provide abrupt short pulses with interpulse intervals selected to optimize the ability of the eye to perceive the flashes in accordance with psychosensory precepts as discussed above. Therefore, it should be understood that the parameters described above are merely illustrative of effective operation of the present invention, and that the invention admits of various implementations and modification within the scope thereof.

Due to the highly directional emission nature and small size of SLDS, the present invention can be implemented such that multiple SLDs can be arrayed in different geometric shapes with uniform light distribution. This flexibility is useful in creating warning lights which convey specific meanings by specific geometric shapes. For example, an multitude of SLDs can be grouped to outline a triangular shape to warn motorists of a slow moving vehicle.

It is contemplated that the flashing safety warning light according to the present invention may be implemented in various different embodiments without departing from the scope of the invention, which is intended to be limited only by the appended claims.

What is claimed is:

1. A battery-powered flashing superluminescent light emitting diode safety-warning light, comprising:
   at least one superluminescent light emitting diode;
   battery means for supplying direct current; and
   drive means operably connected with said at least one superluminescent light emitting diode and with said battery means for driving said at least one superluminescent light emitting diode with a drive signal Vd consisting of pulses of direct current at a frequency in the range of 1Hz to 12Hz and a pulse duty cycle in the range of 5% to 10%.

2. A battery-powered flashing superluminescent light emitting diode safety warning light according to claim 1, wherein the frequency of said drive signal Vd is in the range of 6Hz to 8Hz.

3. A battery-powered flashing superluminescent light emitting diode safety warning light according to claim 1, wherein the frequency of said drive signal Vd is approximately 7.58Hz.

4. A battery-powered flashing superluminescent light emitting diode safety warning light according to claim 1, wherein the pulse duty cycle of said drive signal Vd is in the range of 6% to 8%.

5. A battery-powered flashing superluminescent light emitting diode safety warning light according to claim 1, wherein the pulse duty cycle of said drive signal Vd is approximately 6%.

6. A battery-powered flashing superluminescent light emitting diode safety warning light according to claim 1, wherein said drive means further comprises:
  low frequency oscillator means for generating an oscillatory square wave pulse output signal Vo having a frequency and pulse duty cycle corresponding to said drive signal Vd; and
  power driver means operably connected between said battery means and said at least one superluminescent light emitting diode and having an input operably connected with a signal output of said low frequency oscillator means and receiving said oscillatory square wave pulse output signal Vo therefrom, and also having an output operably connected with said at least one superluminescent light emitting diode, for generating and supplying said drive signal Vd to said at least one superluminescent light emitting diode by switching the direct current of said battery means on and off in accordance with said oscillatory square wave pulse signal output Vo for flashing said at least one superluminescent light emitting diode on and off at the frequency and duty cycle of said oscillatory square wave pulse output signal Vo.

7. A battery-powered flashing superluminescent light emitting diode safety warning light, comprising:
  at least one superluminescent light emitting diode;
  battery means for supplying direct current;
  low frequency oscillator means operably connected with said battery means, for generating an oscillatory square wave pulse output signal Vo having a frequency in the range of 1Hz to 12Hz and a pulse duty cycle in the range of 5% to 10%; and
  power driver means operably connected between said battery means and said at least one superluminescent light emitting diode and having an input operably connected with a signal output of said low frequency oscillator means and receiving said oscillatory square wave pulse output signal Vo therefrom, and also having an output operably connected with said at least one superluminescent light emitting diode, for generating and supplying a drive signal Vd to said at least one superluminescent light emitting diode by switching the direct current of said battery means on and off in accordance with said oscillatory square wave pulse signal output Vo for flashing said at least one superluminescent light emitting diode on and off at the frequency and pulse duty cycle of said oscillatory square wave pulse output signal Vo.

8. A battery-powered flashing superluminescent light emitting diode safety warning light according to claim 7, wherein the frequency of said oscillatory square wave pulse output signal Vo is in the range of 6Hz to 8Hz.

9. A battery-powered flashing superluminescent light emitting diode safety warning light according to claim 7, wherein the frequency of said oscillatory square wave pulse output signal Vo is approximately 7.58Hz.

10. A battery-powered flashing superluminescent light emitting diode safety warning light according to claim 7, wherein the pulse duty cycle of said oscillatory square wave pulse output signal Vo is in the range of 6% to 8%.

11. A battery-powered flashing superluminescent light emitting diode safety warning light according to claim 7, wherein the pulse duty cycle of said oscillatory square wave pulse output signal Vo is approximately 6%.

12. A method for flashing a superluminescent light emitting diode, comprising:
  driving a superluminescent light emitting diode into forward biased conduction with an oscillatory square wave pulse drive voltage Vd at a frequency in the range of 1Hz to 12Hz and a pulse duty cycle in the range of 5% to 10%.

13. The method according to claim 12, wherein the frequency of said drive signal Vd is in the range of 6Hz to 8Hz.

14. The method according to claim 12, wherein the frequency of said drive signal Vd is approximately 7.58Hz.

15. The method according to claim 12, wherein the pulse duty cycle of said drive signal Vd is in the range of 6% to 8%.

16. The method according to claim 12, wherein the pulse duty cycle of said drive signal Vd is approximately 6%.

* * * * *